(12) United States Patent
Dasgupta et al.

(10) Patent No.: US 11,308,420 B2
(45) Date of Patent: Apr. 19, 2022

(54) CLASSIFICATION OF MEMBERS IN A SOCIAL NETWORKING SERVICE

(71) Applicant: Microsoft Technology Licensing, LLC, Redmond, WA (US)

(72) Inventors: Sayan Dasgupta, Kolkata (IN); David Stephen Mandell Freeman, Mountain View, CA (US)

(73) Assignee: Microsoft Technology Licensing, LLC, Redmond, CA (US)

( * ) Notice: Subject to any disclaimer, the term of this patent is extended or adjusted under 35 U.S.C. 154(b) by 645 days.

(21) Appl. No.: 16/237,306

(22) Filed: Dec. 31, 2018

(65) Prior Publication Data
US 2019/0138935 A1 May 9, 2019

Related U.S. Application Data

(62) Division of application No. 14/857,594, filed on Sep. 17, 2015, now Pat. No. 10,204,307.

(51) Int. Cl.
*G06N 20/00* (2019.01)
*G06N 7/00* (2006.01)

(52) U.S. Cl.
CPC ............ *G06N 20/00* (2019.01); *G06N 7/005* (2013.01)

(58) Field of Classification Search
None
See application file for complete search history.

(56) References Cited

U.S. PATENT DOCUMENTS

| | | | | |
|---|---|---|---|---|
| 7,480,640 B1* | 1/2009 | Elad | ............... | G06Q 10/10 |
| | | | | 706/14 |
| 2005/0234761 A1* | 10/2005 | Pinto | ............... | G06Q 10/063 |
| | | | | 705/7.28 |
| 2015/0339572 A1* | 11/2015 | Achin | ............... | G06Q 10/06 |
| | | | | 706/46 |
| 2017/0124486 A1* | 5/2017 | Chan | ............... | G06N 20/00 |

* cited by examiner

*Primary Examiner* — Alan Chen
(74) *Attorney, Agent, or Firm* — NDWE LLP

(57) ABSTRACT

A method and apparatus for scoring member data in a social networking service is provided. A method comprises receiving input that indicates a particular feature that is not in a set of features upon which a first model is based. In response to receiving the input, training a plurality of models based on training data and a plurality of features that includes the set of features and the particular feature, and selecting, based on one or more criteria, a particular model from among the plurality of models that includes a second model that is of the same type as the first model. Using the particular model to score a particular data set based on the plurality of features indicated in the particular data set.

20 Claims, 4 Drawing Sheets

CLASSIFICATION OF MEMBERS IN A SOCIAL NETWORKING SERVICE

CROSS REFERENCE TO RELATED APPLICATIONS, BENEFIT CLAIM

This application claims the benefit as a Divisional of application Ser. No. 14/857,594, filed Sep. 17, 2015 the entire contents of which is hereby incorporated by reference as if fully set forth herein, under 35 U.S.C. § 120. The applicant hereby rescinds any disclaimer of claim scope in the parent application or the prosecution history thereof and advise the USPTO that the claims in this application may be broader than any claim in the parent application.

TECHNICAL FIELD

The present disclosure relates to data processing techniques and, more specifically, to models used to classify elements within a set.

BACKGROUND

Social networking services are online services that allow people to connect with one another and publish or distribute content between themselves and to others. People may publish profile pages describing themselves, send private messages to one another, or publish content to one or more groups of people. Some social networking services allow two users to connect to or "friend" one another within the service.

Because of the number of people using social networking services and the amount of personal data shared via social networking services, social networking services can attract bad actors that pose as legitimate users, such as fraudsters and spammers. Further, unauthorized bots and crawlers can attempt to access the social networking service.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

To protect its members, social networking services attempt to distinguish legitimate members from bad actors. Current techniques for doing so are inadequate. Systems and methods described herein provide an improvement over current techniques. Legitimate members are members who have agreed to, and are in compliance with, the terms of service (TOS) of the social networking service. Bad actors are not in compliance with the TOS of the social networking service and may include, but are not limited to, spammers, bots, fraudsters, malicious actors, and unauthorized web crawlers.

A social networking service, in its computer systems, can record and store one or more features about its members, including attributes of each member and activities of each member. Attributes of a member include features that describe the member or features that describe other members' interactions with the member. An example attribute of a member is text included in a member's profile or a company where the member claims to work. An activity of a member is an action (or number of actions) initiated by the member. An example activity is a number of messages sent by the member to other members over a period of time.

To classify members as bad actors or legitimate members, at least one model based on two or more of the features is used. The model is a function of the two or more features and outputs a score of the member. The score is used to determine whether the member is a bad actor. If the member is determined to be a bad actor, then the social networking service can restrict the member from taking one or more actions within the social networking service.

The model can be one of a plurality of models created by a reputation scoring system. The plurality of models can each be based on a distinct subset of the features. Some models may use the same subset of features in different ways. The plurality of models are modifiable by adding or removing one or more features. Performance of each model of the plurality of models can be compared using one or more metrics. Based on these metrics, a particular model can be selected for classifying the members of the social networking service.

System Overview

Figure 1:
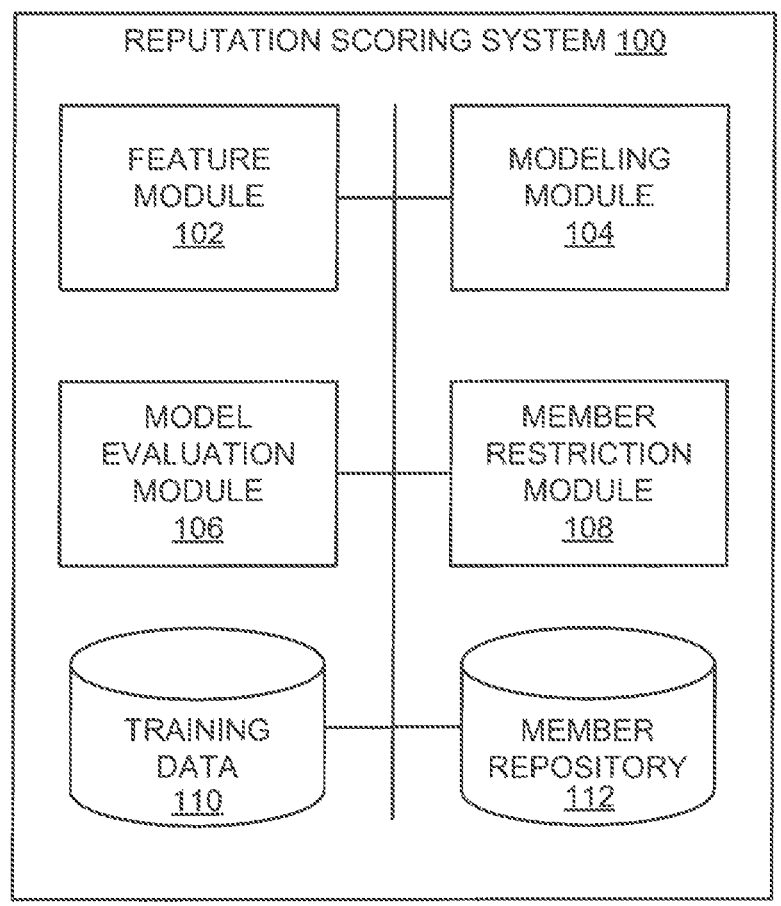
FIG. 1 is a block diagram of a reputation scoring system, according to various embodiments.

A reputation scoring system for classifying members of a social networking service is provided. FIG. 1 is a block diagram of the reputation scoring system 100, according to various embodiments. The reputation scoring system 100 comprises a feature module 102, a modeling module 104, a model evaluation module 106, an optional member restriction module 108, a member repository 110, and training data 112. The reputation scoring system is configured to create a plurality of models for classifying members of the social networking service, evaluate the models, classify members as legitimate members or bad actors, and, optionally, restrict actions of the classified bad actors.

The reputation scoring system 100 can be part of the social networking service and may be an internal tool used within the social networking service that is not visible to members of the social networking service. The reputation scoring system 100 may be implemented on one or more computing devices, including computing devices within a cloud computing environment. The reputation scoring system 100 can be maintained in a single location or distributed across multiple locations. Further, some portions of the reputation scoring system 100 can be maintained independently of other portions. For example, the model evaluation module 106 can be maintained independently of the member restriction module 108. The reputation scoring system 100 can include greater or fewer modules depending on the particular implementation.

The feature module 102 is configured to access one or more features within the social networking service. In some embodiments, other systems generate various features that are then made accessible to the reputation scoring system 100. The feature module 102 can access or retrieve the individual features. In some embodiments, the feature module 102 accesses new features as they become available and adds the new features (or a link thereto) to a feature library (not depicted).

The feature module 102 is configured to access or calculate the output of the one or more features for a population of members. In some embodiments and for some features, other systems within the social networking service calculate a numerical result corresponding with the feature for each member. In other embodiments, the feature module 102 accesses executable instructions for calculating each feature then calculates the numerical result using data stored in the member repository 112 or training data 114. Examples of features are described in connection with FIG. 2, below.

The modeling module 104 is configured to generate one or more classification models using at least some of the features accessed by the feature module 102. The models each use two or more features to calculate a score for each member. The generated models can be linear or non-linear. In some embodiments, the models are generated using machine learning techniques. Examples of models include logistic regression models, generalized boosting machine, gradient-boosted tree models, Random Forest models, Support Vector Machines, Neural Networks, and Deep Learning models.

The model evaluation module 106 is configured to evaluate the pluralities of models generated by the modeling module 104. The model evaluation module 106 evaluates performance of each of the models using one or more metrics. The metrics can include, for example, Area Under the Curve (AUC), which is a metric for binary classification that measures the area under the Receiver Operating Characteristic (ROC) curve, and also indicates the probability that a random positive example has a higher model score than a random negative example. Other metrics include precision at a fixed recall, recall at a fixed precision, or maximum F-score, F1 Score, and overall accuracy. The performance of the respective models can be evaluated over time such that the model evaluation module 106 can generate a trend of the performance of each particular model.

In some embodiments, the metrics used can evaluate the respective features. Each feature used in the models can be evaluated to determine its ability to distinguish bad actors from legitimate members. The performance of the respective features can be evaluated over time such that the model evaluation module 106 can generate a trend of the performance of each particular feature.

The member restriction module 208 is configured to, for each member of the social networking service, determine a reputation score of the member using the models generated by the modeling module 104. The output of member restriction module 208, for each of the models generated and for each member under test, is a score indicating whether the member under test is a legitimate member or a bad actor. In some embodiments, the score is normalized to a value between zero and one. In further embodiments, the score is limited to the binary set {0,1}.

The member restriction module 108 is configured to determine whether and how to restrict the actions of a member determined to be a bad actor based on the reputation score. The member restriction module 108 can restrict the bad actor from performing one or more actions, such as logging on to the social networking service or publishing content on the social networking service.

The training data 110 is a partial collection of member accounts hosted, or formerly hosted, by the social networking service. Within the training data, the respective member accounts have been evaluated and are annotated as being either legitimate members or bad actors. The training data 110 can be used by the modeling module 104 to generate new models or by the model evaluation module 106 to evaluate generated models.

The member repository 112 is an uncurated, unannotated collection of the member accounts hosted by the social networking service. The member restriction module 108 can access the member repository 112 to determine whether the members are, respectively, legitimate members or bad actors.

Identifying Bad Actors

Figure 2:
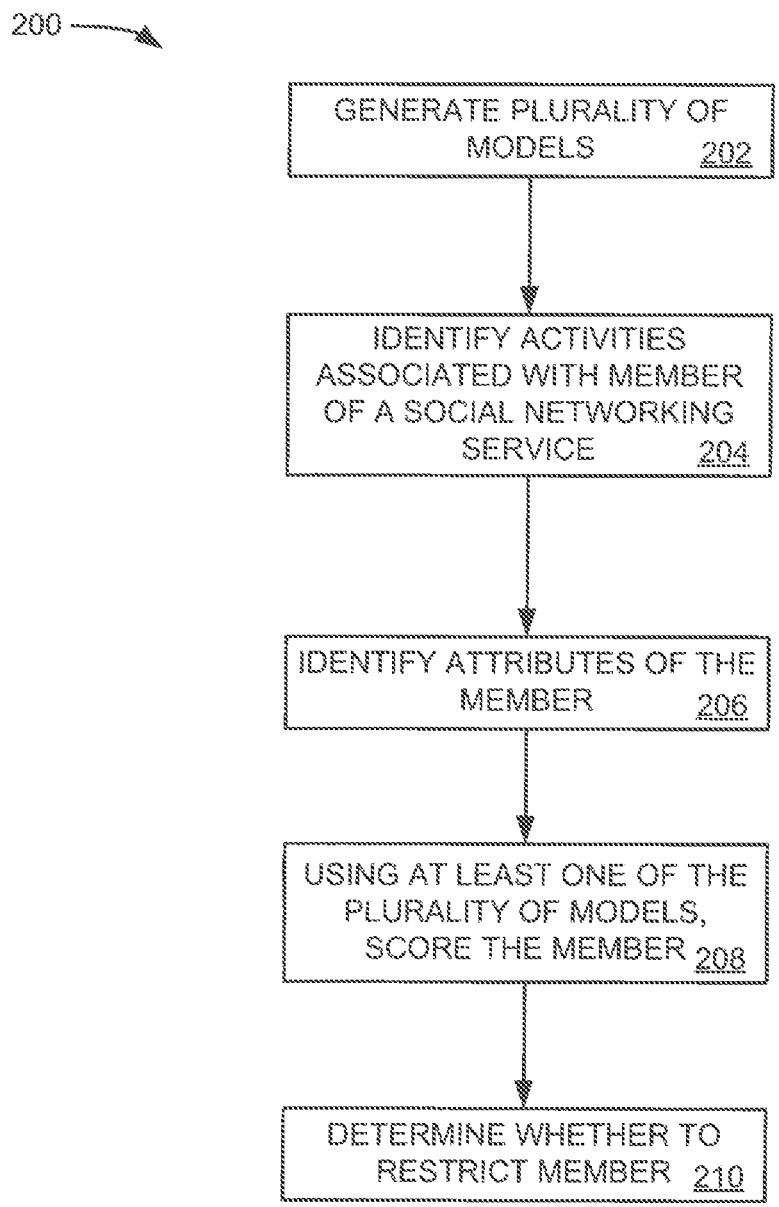
FIG. 2 is a flowchart of a method of identifying and restricting actions of a profile of a bad actor, according to various embodiments.

FIG. 2 is a flowchart of a method 200 of identifying a bad actor and restricting actions of a profile of the bad actor, according to various embodiments. The method 200 can be performed by the reputation scoring system 100. The method 200 is performed within the social networking service to identify bad actors within the social networking service. The social networking service can have millions of members, making manual classification of members time-consuming, expensive, and prone to human error. The operations 204-210 can be performed over the course of a day to evaluate and score each member of the social networking service.

In an operation 202, the modeling module 104 generates one or more models. To generate a model, the modeling module 104 selects at least a portion of available features, accessible by the feature module 102. Available features can be based on activities or attributes of the member within the social networking service.

Attributes include features that describe the member or features that describe other members' interactions with the member. Example attributes that can be accessed by the feature module 102 include, but are not limited to, a reputation of an IP address associated with the particular member account, a comparison between a first IP address associated with an initial registration of the particular member account and a second IP address associated with a subsequent login of the particular member account, a number of times that other members of the social network service have identified content associated with the particular member account as inappropriate, a number of times the particular member account has been restricted in some manner, a number of invitations (to connect) that other members of the social network service have accepted from the particular member where the other members are considered legitimate users, a number of invitations (to connect) that other members of the social network service have accepted from the particular member where the other members are considered bad actors, a number of times an email address associated with the particular member account appears in address books of other users of the social network service, an interconnectedness score that indicates how connected the particular member account is to other member accounts, or a rate of change of any of these metrics.

An activity is an action (or number of actions) initiated by the member. Example activities include, but are not limited to, a number of messages sent from the particular member account, a number of invitations to connect sent from the particular member account, a comparison between a first country corresponding to a first IP address associated with a portion of the one or more activities and a second country indicated by a profile associated with the particular member account, or a number of member profiles accessed from the particular member account within a period of time.

The one or more models are generated from the set of features or a selected subset of the features. If a subset is used, then the subset can be selected manually or automatically by the features module 102. The features module 102, when selecting the subset of features, can access metrics from the model evaluation module 106 about the respective features or past combinations of features. The metrics can be used to automatically select two or more features for a particular subset. Particular features are selected that can be used to distinguish bad actors from good members. In other embodiments, a subset of the features can be selected at random or pseudo-randomly.

Using a plurality of sets and/or subsets of the features, the modeling module 104 generates the one or more models. As described above, the one or more models can be linear or non-linear.

By generating the models, the modeling module 104 trains at least one of the generated models using training data 110. Some models generated using certain techniques, such as machine learning techniques, are automatically trained before classifying members based on member data stored in the member repository 112. The training can comprise using the model to classify member data included in the training data 110 to modify the model being used.

To train the models, the training data 110 can be sampled to achieve different results. The training data 110 can comprise member data corresponding to bad actors in a proportion roughly equal to the proportion observed within the social networking service. In some instances, such as models using machine learning techniques, the models can be trained using a biased sample of member data in the training data 110. For example, if the training data is 95% legitimate member data, and 5% bad actor data, then the training data can be sampled such that it is more biased towards bad actor data, meaning that the training data comprises, for example, 70% legitimate member data, and 30% bad actor data. Because the training data 110 is sampled to bias bad actors, the subject model may be better able to identify a more diverse set of bad actors in the member repository 112. In some instances, sampling can be performed based on different time frames. For example, more weight can be given to the members who registered last year compared to this year.

The models are further evaluated by the model evaluation module 106 to obtain one or more metrics about the generated models. The metrics can be used to evaluate the features within the generated models individually, as a set, or as a subset, or to evaluate the model itself. The evaluation metrics used in the operation 202 can provide metrics such as those discussed above.

In an operation 204, for a particular member of the social network service, the member restriction module 108 identifies, from the member repository 112, activities associated with the particular member. Likewise, in an operation 206, for the particular member, the member restriction module 108 identifies attributes of the particular member. The activities and attributes of the particular member can be identified as associated with the particular member by virtue of being stored in association with an identifier of the particular member. In some embodiments, the activities and attributes identified may be associated with a particular characteristic, such as a particular time period or a particular IP address.

In an operation 208, using one of the one or more models generated in the operation 202, the member restriction module 108 scores the particular member using at least one of the models. The score is a numerical value that may be normalized to a value greater than zero and less than one. In some embodiments, at least some of the models provide a binary output by, for example, comparing an initial score to a threshold and assigning a binary score accordingly.

In an operation 210, the member restriction module 108 determines whether to restrict the particular member from partaking in one or more activities within the social networking service. In some instances, the particular member may be restricted from using the social networking service, while in others, the particular member may be restricted from only certain activities. Examples of activities that can be restricted by the member restriction module 208 include, but are not limited to, logging into the site, sending personal messages to other members, sending invitations, uploading email addresses, uploading content, liking content, and having uploaded/liked content viewable in others' feeds.

Selecting a Model

Figure 3:
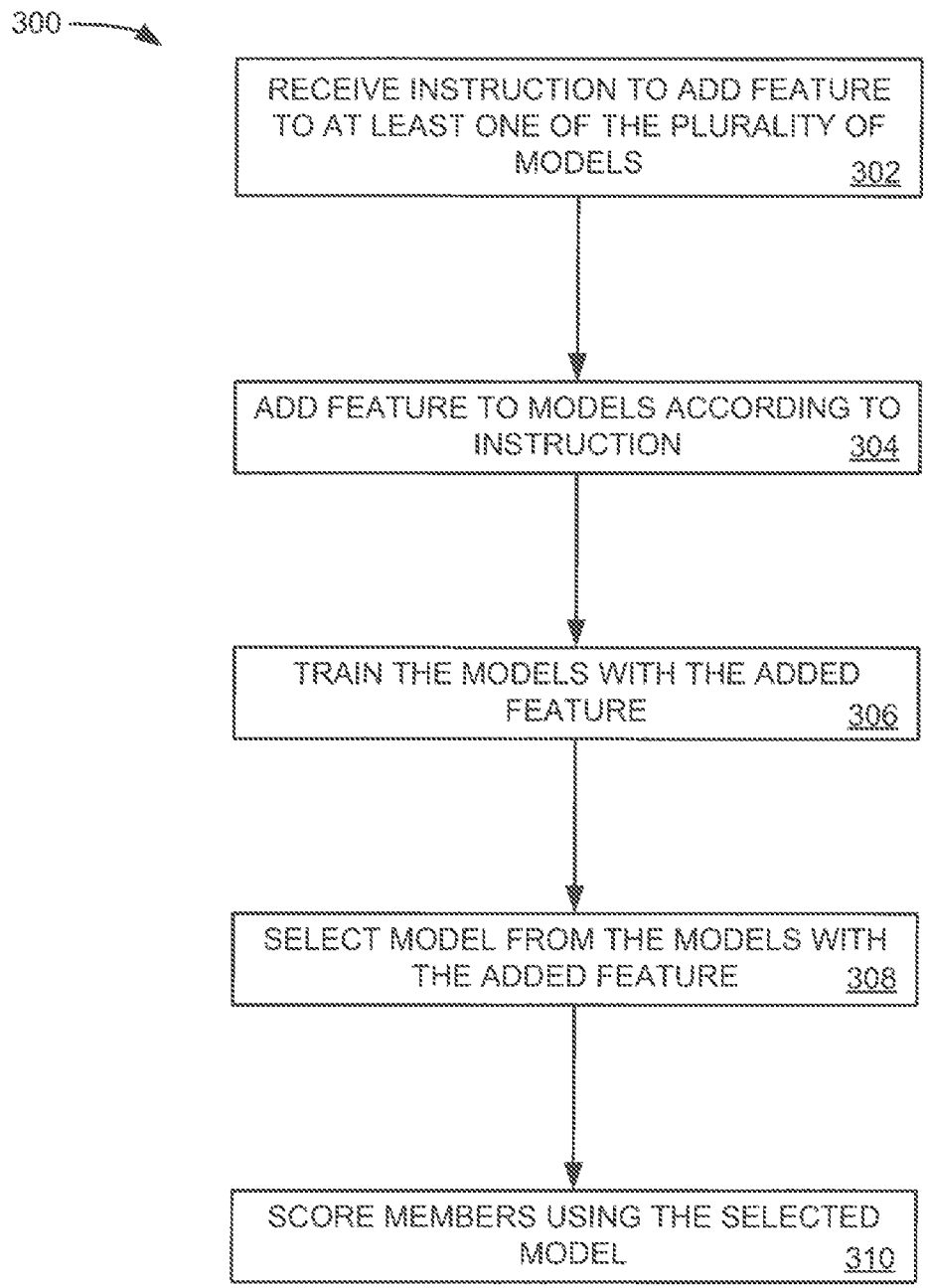
FIG. 3 is a flowchart of a method of generating and selecting a model from a plurality of models, according to various embodiments.

FIG. 3 is a flowchart of a method 300 of generating and selecting a model from a plurality of models, according to various embodiments. The method 300 can be performed to add or remove one or more features from the models of method 200. The method 300 allows the reputation scoring system 100 to be extensible and flexible over time as new types of bad actors are found and as features evolve in response to changes in the social networking service.

In an operation 302, the modeling module 104 receives an instruction from the features module 102 to add a feature to at least one of the plurality of models. The added feature can be a new feature developed by the social networking service or a modified version of an existing feature. The instruction may further instruct or cause the modelling module 104 to remove a feature from the existing models. The new feature can be identified as being more powerful in distinguishing the bad actors from good actors. An existing feature may be removed if it does not have enough distinguishing capabilities in the light of the modeling sample or if it adds noise to the system.

In an operation 304, the modeling module 104 adds the feature to one or more of the models according to the instruction. In some embodiments, the instruction instructs that the feature be added to only some of the existing models based on a characteristic of the feature or a characteristic of the model.

In an operation 306, the modeling module 104 trains the models having the added feature using the training data 110. The training may be performed as described in association with the operation 202. Based on the training, the model evaluation module 106 provides one or more metrics about the model. The metrics can be used to evaluate the effectiveness of the added feature in distinguishing legitimate members from bad actors.

In an optional operation 308, using the metrics of the operation 306, one or more of the models having the added feature can be selected for use in evaluating member data stored in the member repository 112. The operation 308 allows the modeling module 104 to reject models that are not as effective as existing models and to allow for models that rely on different subsets of features, making for a more robust system.

In an operation 310, the member restriction module 108 scores members using at least one model with the added feature. In embodiments where the operation 308 is performed, the members are scored using the selected model. The scoring is performed as described in connection with the operation 208. The scores generated in the operation 310 can be used by the member restriction module 108 to restrict member activities as described in connection with the operation 210.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
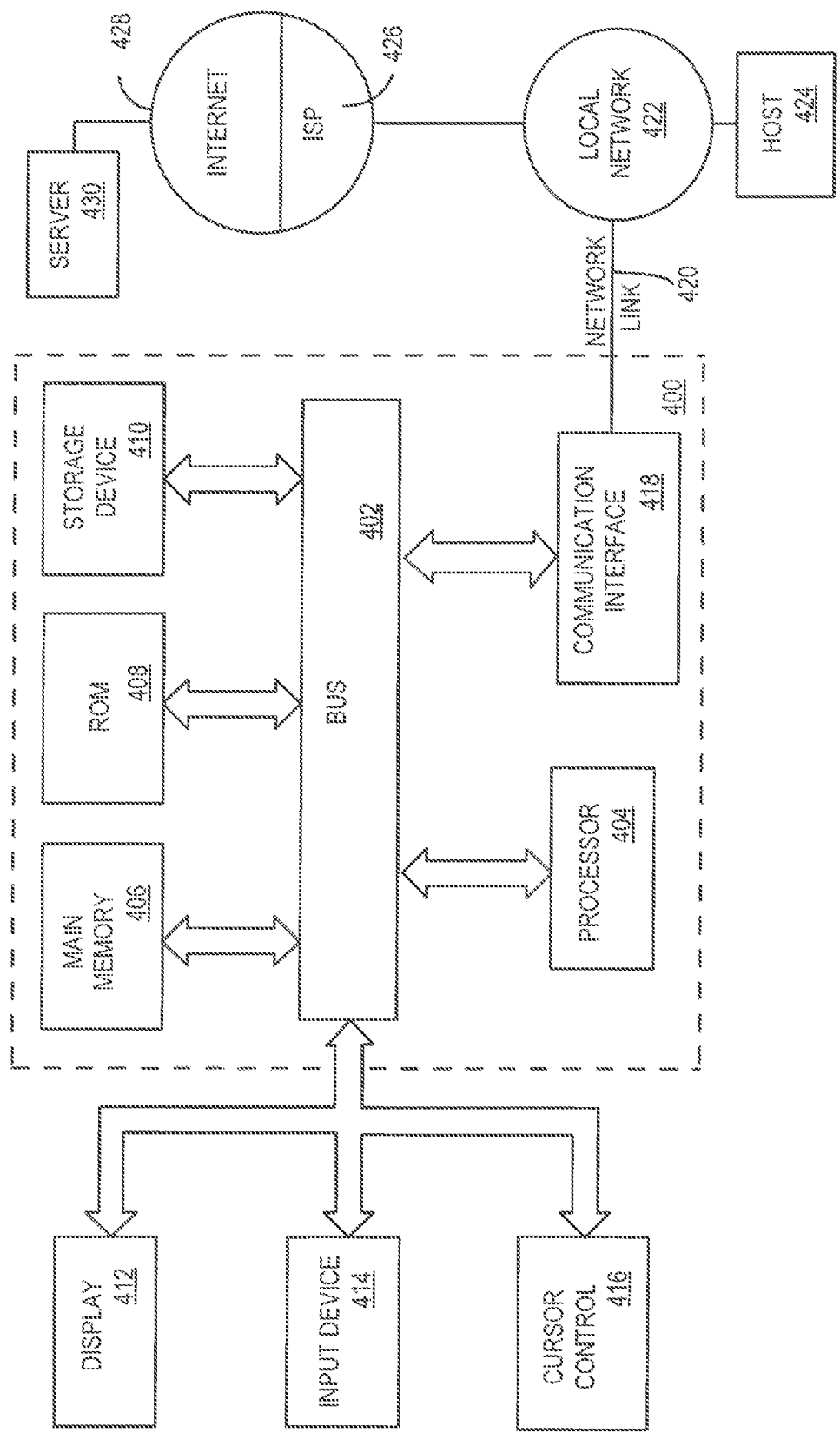
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422.

For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   identifying a particular feature as capable of distinguishing legitimate members of a social network service from a new type of bad actor;
   receiving input that indicates that the particular feature is not in a set of features upon which a first model is based;
   in response to receiving the input:
   training a plurality of models based on training data and a plurality of features that includes the set of features and the particular feature;
   selecting, based on one or more criteria, a particular model from among the plurality of models that includes a second model that is of a same type as the first model; and
   using the particular model to score a particular data set based on the plurality of features indicated in the particular data set,
   wherein the method is performed by one or more computing devices.

2. The method of claim 1, further comprising:
   determining, based on a plurality of scores generated from scoring the particular data set, whether to apply a restriction to a member account to prevent a member of the member account from performing one or more actions associated with a social network service.

3. The method of claim 2, wherein the restriction includes:
   blocking the member from logging in to the member account,
   blocking the member from sending additional invitations to connect to other member accounts,
   blocking the member from sending messages to other member accounts, or
   blocking the member account from publishing content via the social networking service.

4. The method of claim 1, further comprising:
   identifying, from the plurality of features, a first feature that has an excessive effect on a score generated from scoring the particular data set;
   modifying the particular model to create a modified model that reduces an effect of the first feature relative to the particular model or that does not include the first feature; and
   re-training the modified model based on the training data.

5. The method of claim 1, wherein the one or more criteria comprise a trend of scores generated by the particular model over a period of time.

6. The method of claim 1, wherein the one or more criteria comprise an Area Under a Curve (AUC) metric of scores generated from scoring the particular data set using the particular model.

7. The method of claim 1, wherein the plurality of models is generated using a plurality of subsets of features of the plurality of features, each of the subsets of features containing at least the particular feature.

8. One or more storage media storing instructions which, when executed by one or more processors, cause:
   identifying a particular feature as capable of distinguishing legitimate members of a social network service from a new type of bad actor;
   receiving input that indicates that the particular feature that is not in a set of features upon which a first model is based; and
   in response to receiving the input:
   training a plurality of models based on training data and a plurality of features that includes the set of features and the particular feature;
   selecting, based on one or more criteria, a particular model from among the plurality of models that includes a second model that is on of a same type as the first model; and
   using the particular model to score a particular data set based on the plurality of features indicated in the particular data set.

9. The one or more storage media of claim 8, wherein the instructions, when executed by the one or more processors, further cause:
   determining, based on a plurality of scores generated from scoring the particular data set, whether to apply a restriction to a member account to prevent a member of the member account from performing one or more actions associated with a social network service.

10. The one or more storage media of claim 9 wherein the restriction includes:
    blocking the member from logging in to the member account,
    blocking the member from sending additional invitations to connect to other member accounts, blocking the member from sending messages to other member accounts, or blocking the member account from publishing content via the social networking service.

11. The one or more storage media of claim 8, wherein the instructions, when executed by the one or more processors, further cause:

identifying, from the plurality of features, a first feature that has an excessive effect on a score generated from scoring the particular data set;

modifying the particular model to create a modified model that reduces an effect of the first feature relative to the particular model or that does not include the first feature; and re-training the modified model based on the training data.

12. The one or more storage media of claim 8, wherein the one or more criteria comprise a trend of scores generated by the particular model over a period of time.

13. The one or more storage media of claim 8, wherein the one or more criteria comprise an Area Under a Curve (AUC) metric of scores generated from scoring the particular data set using the particular model.

14. The one or more storage media of claim 8, wherein the plurality of models is generated using a plurality of subsets of features of the plurality of features, each of the subsets of features containing at least the particular feature.

15. A system comprising: one or more processors;

one or more storage media storing instructions which, when executed by the one or more processors, cause:

identifying a particular feature as capable of distinguishing legitimate members of a social network service from a new type of bad actor;

receiving input that indicates that the particular feature that is not in a set of features upon which a first model is based;

in response to receiving the input:

training a plurality of models based on training data and a plurality of features that includes the set of features and the particular feature;

selecting, based on one or more criteria, a particular model from among the plurality of models that includes a second model that is of a same type as the first model; and using the particular model to score a particular data set based on the plurality of features indicated in the particular data set.

16. The system of claim 15, wherein the instructions, when executed by the one or more processors, further cause:

determining, based on a plurality of scores generated from scoring the particular data set, whether to apply a restriction to a member account to prevent a member of the member account from performing one or more actions associated with a social network service.

17. The system of claim 15, wherein the instructions, when executed by the one or more processors, further cause:

identifying, from the plurality of features, a first feature that has an excessive effect on a score generated from scoring the particular data set;

modifying the particular model to create a modified model that reduces an effect of the first feature relative to the particular model or that does not include the first feature; and re-training the modified model based on the training data.

18. The system of claim 15, wherein the one or more criteria comprise a trend of scores generated by the particular model over a period of time.

19. The system of claim 15, wherein the one or more criteria comprise an Area Under a Curve (AUC) metric of scores generated from scoring the particular data set using the particular model.

20. The system of claim 15, wherein the plurality of models is generated using a plurality of subsets of features of the plurality of features, each of the subsets of features containing at least the particular feature.

* * * * *